March 27, 1951 R. R. GANNAWAY 2,546,591
HIGH-VOLTAGE POWER SUPPLY
Filed Nov. 12, 1947

INVENTOR.
Robertson R. Gannaway
BY
Foorman L. Mueller
Atty.

Patented Mar. 27, 1951

2,546,591

UNITED STATES PATENT OFFICE 2,546,591

HIGH-VOLTAGE POWER SUPPLY

Robertson R. Gannaway, Oak Park, Ill., assignor to Belmont Radio Corporation, Chicago, Ill., a corporation of Illinois Application November 12, 1947, Serial No. 785,379

4 Claims. (Cl. 250—36)

1

This invention relates to high-voltage power supplies, particularly for use with cathode ray tubes in television systems and the like.

In television systems the D. C. power supplies (in some instances) are required to furnish high-voltage, low-current power to operate picture tubes, for example. It has been found convenient to obtain such power from a radio-frequency oscillator which is coupled through a step-up transformer to an output circuit that includes a rectifier and filter for converting the radio-frequency oscillations to direct current. One such arrangement that has been proposed heretofore utilizes an oscillator having a tuned plate circuit which is coupled inductively to an output coil in circuit with the rectifier, this output coil being in turn coupled inductively to a tickler coil in the grid circuit of the oscillator tube. This arrangement is advantageous in many respects but it has a serious drawback in that there are very severe insulation requirements between the output and tickler coils.

An object of the present invention is to eliminate the hazard of insulation breakdown between coils in a high voltage power supply employing a radio-frequency oscillator.

A further object is to improve the construction of such a power supply by eliminating the tickler coil from the transformer structure and replacing it with a feedback coil that is not inductively coupled to the secondary or output coil of the transformer.

A still further object is to increase the useful life of radio-frequency high-voltage power supplies, particularly insofar as the transformer is concerned.

An especially advantageous feature is that the feedback coil is physically separate from the step-up transformer. This results in a simplified and safer transformer design.

In accordance with the present invention, the tank circuit of a radio-frequency oscillator is coupled inductively to a secondary coil which is in series with a feedback coil of the oscillator. The secondary and feedback coils are in circuit with the rectifier and filter, but are not inductively coupled to each other. The value of the feedback inductance is selected in proper relation to the values of mutual and self-inductances in the transformer winding for proper operation of the oscillator.

Figure 1:
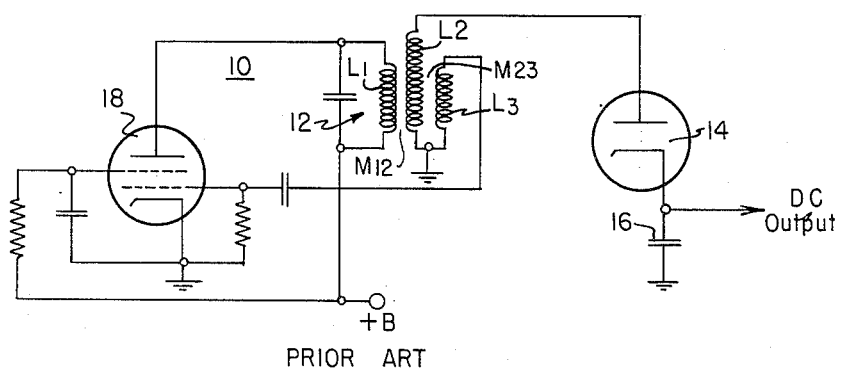

For a better understanding of the invention, reference is had to the following detailed description taken in connection with the accompanying drawing, in which:

Fig. 1 is a circuit diagram of a commonly used type of radio-frequency high-voltage power supply heretofore known in the art; and

2

Figure 2:
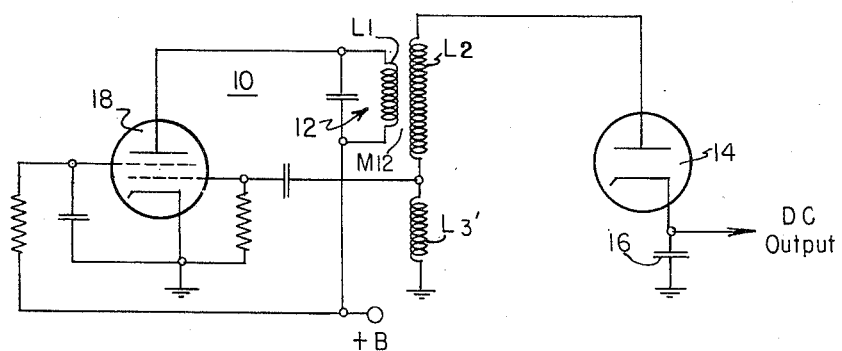

Fig. 2 is a circuit diagram of a radio-frequency high-voltage power supply constructed in accordance with and embodying the principles of my invention.

In Fig. 1 there is illustrated a high-voltage power supply which has been proposed heretofore to supply the high voltage needed for operating cathode-ray tubes and the like. A radio-frequency oscillator 10 has a tank circuit 12 which is inductively coupled through a mutual inductance M12 to an output circuit including the coil L2, rectifier tube 14, and filter condenser 16. The tank coil L1 and the output coil L2 respectively constitute the primary and secondary of a step-up transformer. The coil L2 is coupled through the mutual inductance M23 to a tickler coil L3 which is connected to the control grid of the oscillator tube 18. The coils L1 and L3 are so disposed that there is substantially no direct coupling between them, and they are coupled solely through the medium of the coil L2 and the aforesaid mutual inductances. The polarities of the coils L1 and L3 are such that if any substantial mutual inductance existed between them, oscillations would be produced by reason of such relative polarity. Actually, however, the coil L3 is inductively coupled to coil L2 rather than to coil L1. Coupling the tickler to the secondary instead of the primary avoids undesirable instability of grid excitation with changes in output.

In the arrangement just described difficulty is experienced in properly insulating the high-voltage ends of the coils L2 and L3 from each other. This problem has tended to discourage the use of such power supplies, despite their advantages of simplicity, economy, compactness and light weight.

The troublesome tickler coil of Fig. 1 can be dispensed with if the control grid of tube 18 is supplied with voltage of the correct magnitude and polarity from another source. To this end I provide, as shown in Fig. 2, a different arrangement wherein the tickler coil L3 of Fig. 1 is replaced by a feedback coil L3' that is connected in series with the secondary coil L2 but is not inductively coupled thereto. The polartity of L2 is such that the correct feedback phase is obtained for sustaining oscillations. I have found that satisfactory performance is obtained by making the value of L3' approximately equal to the mutual inductance M23 in Fig. 1. The coil L3' is separate from the transformer comprising the coils L1 and L2, and consequently there is no severe insulation problem as in the case of the circuit in Fig. 1.

Insofar as I am aware, previous developments in connection with radio-frequency high-voltage power supplies of the type herein described have not been directed toward the physical separation of the feedback coupling element from the step-up transformer. It was thought necessary that the grid of the oscillator tube be excited through the medium of a tickler coil inductively coupled to a winding of the transformer, because any other arrangement might entail a considerable increase in the total self-inductance of the circuit without a corresponding increase in the mutual inductance, thereby seriously reducing the coefficient of coupling. It was believed that this would require much closer spacing of primary and secondary windings and thus give rise to a more aggravated insulation problem. However, my proposed arrangement shown in Fig. 2 has proved to be free of these difficulties. The inductance $L3'$ is of the order of 500 microhenries, which is insignificant when compared with the inductance $L2$ (usually around 100 millihenries) so that no material reduction in the coupling coefficient is effected. Other objections which heretofore have been raised against any substantial modification of the circuit in Fig. 1 likewise have been found to be of no practical consequence in the circuit of Fig. 2, when compared with the advantage that no insulation need be provided between the secondary and feedback coils for guarding against voltage breakdown.

Thus, it is evident that I have provided in Fig. 2 a circuit which is superior to the arrangement shown in Fig. 1. The improvements described above result in a safer and more dependable high-voltage power supply and also serve to reduce the cost of the unit without detracting from its performance.

While there has been disclosed a preferred embodiment of the invention, modifications obviously can be made therein without departing from the spirit of the invention, and it is intended that all such modifications shall be included in the scope of the appended claims.

I claim:

1. An oscillator for providing high voltage oscillations including in combination, oscillator tube means having input and output electrodes, a step-up transformer having primary and secondary windings in inductive relation with each other, a circuit including said primary winding connected across said output electrodes of said oscillator tube means so that when said tube means is rendered conducting a high voltage is induced in said secondary winding, a feedback coil in non-inductive relation with said transformer windings, a closed output circuit including said secondary winding and said feedback coil with said feedback coil being connected between one end of said secondary winding and a low potential point, and a feedback circuit connected to said feedback coil and to said input electrodes of said oscillator tube means for applying the feedback voltage developed across said feedback coil to said input electrodes, said feedback voltage sustaining oscillations in said oscillator tube means.

2. An oscillator for providing high voltage oscillations including in combination, oscillator tube means having output electrode means and control electrode means, a step-up transformer having primary and secondary windings in inductive relation, a source of potential, a circuit including said primary winding and said source of potential connected to said output electrode means of said oscillator tube means so that a high voltage is induced in said secondary winding when oscillations are produced in said tube means, a feedback coil having two terminals and positioned in non-inductive relation with respect to said transformer windings, a closed output circuit including said secondary winding and said feedback coil connected in series with one terminal of said feedback coil being connected to a low potential point, and a feedback circuit connecting the other terminal of said feedback coil to said control electrode means of said oscillator tube means for applying the feedback voltage developed across said feedback coil to said oscillator tube means for producing oscillations therein.

3. An oscillator for use in a high-voltage power supply circuit which includes means for rectifying oscillations, including in combination, an oscillator tube having input and output electrodes, a step-up transformer having primary and secondary windings, means connecting said primary winding across said output electrodes so that oscillations in said tube produce a high voltage in said secondary winding, a feedback coil in non-inductive relation with said transformer, a closed circuit including load means, said secondary winding and said feedback coil connected in series, and circuit means connecting said feedback coil across said input electrodes of said oscillator tube so that the voltage across said feedback coil provides feedback for sustaining oscillations in said tube.

4. As oscillator for providing high voltage oscillations including in combination, oscillator tube means including output electrode means and control electrode means, a step-up transformer having primary and secondary windings, a source of potential, a circuit including said primary winding connecting said output electrode means to said source of potential, said transformer inducing high voltage oscillations in said secondary winding thereof when oscillations are produced in said tube means, a feedback coil positioned in non-inductive relation with respect to said transformer windings, an output circuit including said secondary winding and said feedback coil connected in series, with said feedback coil being connected between said secondary winding and a point of low potential, and a feedback circuit for applying the feedback voltage developed across said feedback coil to said control electrode means for sustaining oscillations in said oscillator tube means, said feedback coil having a value of self-inductance approximately equal to the value of mutual inductance that would be required between said secondary winding and a feedback winding inductively related thereto for producing the equivalent oscillator power output.

ROBERTSON R. GANNAWAY.

REFERENCES CITED

The following references are of record in the file of this patent:

UNITED STATES PATENTS

| Number | Name | Date |
|---|---|---|
| 1,238,869 | Wright | Sept. 4, 1917 |
| 2,070,900 | Harris | Feb. 16, 1937 |
| 2,234,895 | Cerveny et al. | Mar. 11, 1941 |
| 2,276,832 | Dome | Mar. 17, 1942 |
| 2,306,888 | Knick | Dec. 29, 1942 |
| 2,374,781 | Schade | May 1, 1945 |
| 2,443,125 | Weathers | June 8, 1948 |